(12) United States Patent
Bekiarov (10) Patent No.: US 8,289,005 B2
(45) Date of Patent: Oct. 16, 2012

(54) FIELD TRANSIENT SUPPRESSION SYSTEM AND METHOD

(75) Inventor: Stoyan Borissov Bekiarov, Chicago, IL (US)

(73) Assignee: C.E. Niehoff & Co., Evanston, IL (US)

( * ) Notice: Subject to any disclaimer, the term of this patent is extended or adjusted under 35 U.S.C. 154(b) by 758 days.

(21) Appl. No.: 12/286,649

(22) Filed: Sep. 30, 2008

(65) Prior Publication Data

US 2010/0079117 A1 Apr. 1, 2010

(51) Int. Cl.
*H02P 11/00* (2006.01)
*H02P 9/00* (2006.01)
*H02H 7/06* (2006.01)
*H02P 9/10* (2006.01)
*H02P 9/14* (2006.01)

(52) U.S. Cl. ............... 322/28; 322/25; 322/59

(58) Field of Classification Search .......... 322/25, 322/28, 59
See application file for complete search history.

(56) References Cited

U.S. PATENT DOCUMENTS

| | | | | |
|---|---|---|---|---|
| 4,386,310 A | * | 5/1983 | Sievers | 322/28 |
| 4,486,702 A | * | 12/1984 | Edwards | 322/28 |
| 4,590,414 A | * | 5/1986 | Mayumi et al. | 320/123 |
| 4,673,862 A | * | 6/1987 | Wahlstrom | 320/160 |
| 4,709,200 A | * | 11/1987 | Ochiai | 320/166 |
| 4,733,159 A | * | 3/1988 | Edwards et al. | 323/282 |
| 4,882,531 A | * | 11/1989 | Edwards et al. | 322/60 |
| 5,089,766 A | | 2/1992 | Iwatani | 322/25 |
| 5,233,285 A | * | 8/1993 | Pierret et al. | 322/28 |
| 5,656,922 A | | 8/1997 | La Velle et al. | 322/46 |
| 5,672,954 A | | 9/1997 | Watanabe | 322/28 |
| 5,686,819 A | | 11/1997 | Iwatani et al. | 322/25 |
| 5,731,689 A | | 3/1998 | Sato | 322/25 |
| 5,731,690 A | * | 3/1998 | Taniquchi et al. | 322/28 |
| 5,767,659 A | * | 6/1998 | Farley | 320/106 |
| 5,786,685 A | * | 7/1998 | Lange et al. | 323/270 |
| 5,825,161 A | * | 10/1998 | Fujikura et al. | 320/162 |
| 5,907,233 A | | 5/1999 | Jabaji | 322/28 |
| 6,118,248 A | * | 9/2000 | Gartstein et al. | 320/107 |
| 6,163,131 A | * | 12/2000 | Gartstein et al. | 320/118 |
| 6,198,250 B1 | * | 3/2001 | Gartstein et al. | 320/112 |
| 6,373,230 B2 | | 4/2002 | Jabaji | 322/28 |
| 6,483,277 B1 | * | 11/2002 | Harmon | 322/28 |
| 6,664,767 B2 | | 12/2003 | Takahashi et al. | 322/28 |
| 6,771,040 B2 | | 8/2004 | Kusumoto et al. | 318/801 |
| 6,943,536 B2 | * | 9/2005 | Marino et al. | 323/288 |
| 7,106,028 B2 | | 9/2006 | Iwatani | 322/28 |
| 7,106,030 B2 | | 9/2006 | Isurin et al. | 322/59 |
| 7,154,249 B2 | | 12/2006 | Velhner et al. | 322/59 |
| 7,161,330 B2 | | 1/2007 | Velhner et al. | 322/75 |
| 7,245,112 B2 | | 7/2007 | Velhner et al. | 322/59 |
| 7,276,804 B2 | | 10/2007 | Jabaji | 290/1 R |
| 7,304,455 B2 | * | 12/2007 | Okahara et al. | 322/28 |
| 7,352,157 B2 | | 4/2008 | Jabaji | 322/28 |

(Continued)

*Primary Examiner* — Pedro J Cuevas
(74) *Attorney, Agent, or Firm* — Law Offices of Michael M. Ahmadshahi (57) ABSTRACT

A vehicle electrical system comprises a generator, voltage regulator, electrical energy source, and control device. The generator provides electrical current to one or more electrical loads. Voltage variations are suppressed by storing electrical energy of the field coil of the generator in the electrical energy source, and by proving electrical energy from the electrical energy source to the field coil. The control device comprises a controller and a charging module operative to maintain the voltage of the electrical energy source at a predetermined voltage that is above the regulation voltage so as to reduce the generator output voltage variations.

30 Claims, 8 Drawing Sheets

U.S. PATENT DOCUMENTS

| | | | |
|---|---|---|---|
| 7,397,224 B2 | 7/2008 | Jabaji | 322/28 |
| 8,212,389 B2 * | 7/2012 | Morimoto | 307/30 |
| 8,212,528 B2 * | 7/2012 | Takeda | 320/134 |
| 8,229,987 B2 * | 7/2012 | Hosokawa et al. | 708/313 |
| 8,242,624 B2 * | 8/2012 | Brookfield | 307/9.1 |
| 2002/0163321 A1 * | 11/2002 | Harmon | 322/28 |
| 2003/0128019 A1 * | 7/2003 | Marino et al. | 323/288 |
| 2011/0157919 A1 * | 6/2011 | Yedevelly et al. | 363/20 |
| 2011/0157941 A1 * | 6/2011 | Yedevelly et al. | 363/126 |
| 2012/0039098 A1 * | 2/2012 | Berghegger | 363/21.13 |
| 2012/0126765 A1 * | 5/2012 | Stone et al. | 323/283 |
| 2012/0170340 A1 * | 7/2012 | Nakajima et al. | 363/131 |

* cited by examiner

FIELD TRANSIENT SUPPRESSION SYSTEM AND METHOD

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

This invention is related to a system and method for suppressing voltage variations occurring in a vehicle electrical system. In particular, the present invention relates to a control device, including a system and method, which utilizes a charging module to maintain the voltage level of an electrical energy source in the vehicle electrical system at a predetermined voltage that is above a regulation voltage so as to reduce voltage variations in the generator output voltage during normal operating conditions as well as during transient events.

BACKGROUND

The present invention relates to a vehicle electrical system comprising a generator, a voltage regulator, one or more electrical loads, and a control device operative to suppress transients due to sudden variations in the one or more electrical loads. The generator operates to provide electrical current to the electrical loads at a regulation voltage according to the voltage regulator parameters. The voltage regulator operates to maintain the system voltage at the regulation voltage by switching on/off the generator field coil in accordance with the electrical load requirements. The field coil, as is known to artisans of ordinary skill, is coupled with a diode operative to return the field current back into the field coil during the periods when the voltage regulator switches off the field coil. The field current is dissipated every time it passes through the field coil. The dissipation period is a function of the field coil parameters such as its resistance and inductance, known to skilled artisans as the RL parameter. For heavy duty generators operating at high speed and load, the dissipation period can be unacceptably long during which time the system voltage is above a threshold value. This over voltage condition may be long enough to be interpreted by the voltage regulator, equipped with an over voltage protection circuit, as a genuine over voltage condition, causing it to deactivate itself. Alternatively, the over voltage condition may be tolerated by the voltage regulator but nevertheless be long enough to the detriment of certain electrical components within the electrical system.

The control device of the present invention is coupled with an electrical energy source, such as a capacitor, and comprises a charging module which operates to maintain the voltage of the electrical energy source above the regulation voltage so as to suppress the effects of such transient conditions. In particular, the control device operates to charge, maintain, and discharge the electrical energy source, via the charging module, so that the voltage of the electrical energy source is kept at a predetermined voltage which is above the regulation voltage.

The control device is further configured to either store the electrical energy of the field coil in the electrical energy source, or provide the electrical energy in the electrical energy source to the field coil, when the output voltage of the generator differs from the regulation voltage. In particular, the control device operates to provide the electrical energy in the electrical energy source to the field coil when the output voltage of the generator is below the regulation voltage, and to store the electrical energy of the field coil in the electrical energy source when the output voltage of the generator is above the regulation voltage. Accordingly, the control device operates to suppress both under voltage and over voltage conditions which may be caused by sudden connection and disconnection of the electrical loads.

As the number of electrical components in vehicles increases, electrical power consumption increases accordingly. As a result, the vehicle electrical system must use high power generators that can produce sufficient electrical power to meet the demand. High power generators have correspondingly higher energy transients than lower power generators. Transient voltages associated with electrical load variations in such electrical systems can be detrimental to electrical components in the electrical system.

A typical vehicle electrical system includes electrical components that comprise semiconductor devices, such as power field effect transistors (FETs), smart power integrated circuits (ICs), microcontoller units (MCUs), digital signal processors (DSPs), memory, analog ICs, and numerous discrete devices. Sudden load variations in the electrical system due to sudden connection/disconnection of the electrical loads can destroy or otherwise cause malfunction in such devices. These transients are the most potentially destructive transients in the vehicle electrical system due to the combination of high voltage and high energy.

Under voltage condition occurs when one or more electrical loads are suddenly switched on and the generator is unable to produce electrical power fast enough to supply the electrical loads. Over voltage condition occurs when one or more electrical loads are suddenly disconnected and the generator is unable to dissipate the electrical energy in the generator field coil fast enough to keep the magnetic flux within an acceptable level. Although vehicle electrical systems ordinarily include one or more electrical energy sources such as batteries which, to a certain degree, improve the under voltage and over voltage conditions, extreme voltage transients still affect the power quality in such electrical systems. Furthermore, there are some applications where the vehicle electrical system does not include batteries which exacerbate the transient voltage variations due to sudden connection/disconnection of the electrical loads.

Batteries in a vehicle electrical system operate to provide electrical power to the electrical loads when the vehicle engine is turned off and/or when the vehicle engine is turned on but the generator is incapable of generating sufficient electrical power at the operating speed (RPM) to meet the demand, such as is the case when a high electrical power consuming device like an air conditioning unit is switched on. Batteries also act as reservoirs where excess electrical power can be stored, such as is the case when the air conditioning unit is suddenly switched off. Such sudden demand and supply of electrical power in the electrical system can occur even when the vehicle engine is operating at the rated RPM.

For instance, a vehicle electrical system including a generator that is rated to generate 500 Amps at 5000 RPM will, momentarily, experience a dip in the system voltage when a large electrical load is suddenly switched on due to the slow response time of the generator which may last in the order of hundreds of milliseconds. Similarly, a sudden disconnection of the electrical load at the above mentioned RPM, will give rise to a spike in the system voltage that may last for the same time period. These under voltage and over voltage conditions occur even in the presence of one or more batteries in the electrical system.

Not only are these transient conditions detrimental to the electrical components in the vehicle electrical system, repetitive battery under charge and over charge is detrimental to the batteries. Furthermore, the effects of the under voltage and over voltage conditions on the electrical components are intensified in batteryless applications. Consequently, there is a need for a control device that operates to improve the power quality of the electrical system by suppressing voltage transients due to sudden variations in the electrical loads. Although various systems have been proposed which touch upon some aspects of the above problems, they do not provide solutions to the existing limitations in providing high quality electrical power within a vehicle electrical system.

For example, in the Velhner et al. patent, U.S. Pat. No. 7,245,112, and its related patents, U.S. Pat. Nos. 7,161,330, and 7,154,249, an energy discharge apparatus is disclosed for dissipating a quantity of stored magnetic energy in a generator field coil of a brushless generator utilizing a variable impedance device. In particular, the variable impedance device is coupled in series with the generator field coil and includes one or more resistors, transistors, capacitors, and control means to vary the impedance so as to dissipate the stored magnetic energy in the generator field coil. The Velhner system operates differently from the present invention in that it utilizes a variable impedance device and means to vary the impedance to dissipate the excess magnetic energy, whereas the present invention uses an electrical energy source in which the excess electrical energy is dissipated. Furthermore, unlike the present invention, the Velhner system is too complex to operate because it requires multiple signals from multiple components, such as the generator output signal, exciter field signal, and exciter armature signal.

Isurin et al. patent, U.S. Pat. No. 7,106,030, discloses a system for controlling the excitation of a generator field coil to compensate for changes in the electrical loads. In particular the system utilizes a capacitor to store excess electrical energy from sudden disconnection of the electrical loads. However, unlike the present invention, the Isurin system does not include a charging module and thus is unable to maintain the voltage level of the capacitor at a predetermined voltage. Additionally, the Isurin system is incapable to compensate for under voltage that occurs when one or more electrical loads are suddenly switched on.

In today's modern vehicles, the vehicle electrical system comprises a large number of electrical components that consume large amounts of electrical power. Consequently, vehicle electrical systems use high power generators to meet the high electrical power requirement. Additionally, the vehicle electrical system incorporates electrical devices that are often sensitive to voltage fluctuations in the electrical system. As a result, the vehicle electrical system must provide high electrical power while minimizing the transient effects due to connection and/or disconnection of the electrical components. This requires the vehicle electrical system to be capable of rapidly suppressing any under voltage and over voltage conditions that may occur as a result of such connection/disconnection, before the electrical components malfunction or become inoperative. As a simple, yet efficient, alternative to existing technologies, the present invention offers a vehicle electrical system capable of providing high electrical power of high quality to multiple electrical components within the vehicle electrical system.

SUMMARY

The present invention discloses a control device, including a system and method, which can be utilized in a vehicle electrical system to provide high quality electrical power throughout the vehicle. The vehicle electrical system includes a generator coupled with one or more electrical loads and a voltage regulator operative to regulate the generator output at a regulation voltage. The system further includes an electrical energy source, such as a capacitor, where electrical energy is stored and/or extracted. Preferably, the control device utilizes a charging module to charge, maintain, and discharge the electrical energy source such that the voltage of the electrical energy source is maintained at a predetermined voltage above the regulation voltage. Preferably, the control device is further configured to store excess electrical energy from the generator field coil in the electrical energy source and to provide electrical energy from the electrical energy source to the generator field coil in order to suppress over voltage and under voltage conditions.

In one aspect, a vehicle electrical system is disclosed comprising a generator, a voltage regulator, one or more electrical loads, an electrical energy source, and a control device connected to and in communication with the generator and the electrical energy source via a charging module. The control device is configured to maintain the voltage of the electrical energy source at a predetermined voltage that is above the regulation voltage so as to reduce the generator output voltage transients due to sudden variations in the one or more electrical loads. Preferably, the control device is configured to charge the electrical energy source when the voltage of the electrical energy source falls below the predetermined voltage. Preferably, the control device is configured to maintain the charge of the electrical energy source when the voltage of the electrical energy source is at the predetermined voltage. Preferably, the control device is configured to discharge the electrical energy source when the voltage of the electrical energy source is above the predetermined voltage.

In another aspect, a vehicle electrical system is disclosed comprising a generator, a voltage regulator, one or more electrical loads, an electrical energy source, and a control device connected to and in communication with the generator and the electrical energy source via a charging module. The control device is configured to maintain the voltage of the electrical energy source at a predetermined voltage that is above the regulation voltage so as to reduce the generator output voltage transients due to sudden variations in the one or more electrical loads. Preferably, the control device is further configured to one of store the electrical energy of the field coil in the electrical energy source and provide the electrical energy in the electrical energy source to the field coil, when the output voltage of the generator differs from the regulation voltage. In one instance, the control device is configured to store the electrical energy of the generator field coil in the electrical energy source when the generator output voltage is above the regulation voltage. In another instance, the control device is configured to provide the electrical energy of the electrical energy source to the generator field coil when the generator output voltage is below the regulation voltage.

In another aspect, a control device is disclosed that is coupled with a generator and an electrical energy source via a charging module, the generator output voltage being regulated via a voltage regulator at a regulation voltage. The control device is configured to maintain the voltage of the electrical energy source at a predetermined voltage that is above the regulation voltage so as to reduce the generator output voltage transients due to sudden variations in the one or more electrical loads. Preferably, the control device comprises a controller coupled with the generator, electrical energy source, and charging module wherein the controller measures a voltage of the electrical energy source, via a first sense line, and applies one or more control signals, via one or more control lines, in order to maintain the voltage of the electrical energy source at a predetermined voltage that is above the regulation voltage. Preferably, the charging module comprises at least one of a switch, diode, and resistor. Preferably, the controller comprises a microcontroller.

In another aspect, a control device is disclosed that is coupled with a generator and an electrical energy source via a charging module, the generator output voltage being regulated via a voltage regulator at a regulation voltage. The control device is configured to maintain the voltage of the electrical energy source at a predetermined voltage that is above the regulation voltage so as to reduce the generator output voltage transients due to sudden variations in the one or more electrical loads. Preferably, the charging module comprises two switches and the electrical energy source is a capacitor. In one instance, the control device is configured to switch off the first switch and switch on the second switch when the voltage of the capacitor is below the predetermined voltage. In another instance, the control device is configured to switch on the first switch and switch off the second switch when the voltage of the capacitor is at the predetermined voltage. In another instance, the control device is configured to switch on both switches when the voltage of the capacitor is above the predetermined voltage.

In another aspect, a control device is disclosed that is coupled with a generator and an electrical energy source via a charging module, the generator output voltage being regulated via a voltage regulator at a regulation voltage. The control device is configured to maintain the voltage of the electrical energy source at a predetermined voltage that is above the regulation voltage so as to reduce the generator output voltage transients due to sudden variations in the one or more electrical loads. Preferably, the charging module comprises two switches and the electrical energy source is a capacitor. Preferably, the control device is further configured to measure the output voltage of the generator, via a second sense line, and to switch on the second switch when the output voltage of the generator differs from the regulation voltage.

In another aspect, a control device is disclosed that is coupled with a generator and an electrical energy source via a charging module, the generator output voltage being regulated via a voltage regulator at a regulation voltage. The control device is configured to maintain the voltage of the electrical energy source at a predetermined voltage that is above the regulation voltage so as to reduce the generator output voltage transients due to sudden variations in the one or more electrical loads. Preferably, the charging module comprises a switch, a diode, and a resistor. In one instance, the control device is configured to switch off the switch when the voltage of the capacitor is below the predetermined voltage. In another instance, the control device is configured to switch on the switch when the voltage of the capacitor is at the predetermined voltage.

In another aspect, a voltage transient suppression circuit in a voltage regulator is disclosed wherein the regulator is configured to regulate the generator voltage at a regulation voltage and further to reduce the generator output voltage transients due to sudden variations in the one or more electrical loads coupled with the generator. Preferably, the voltage transient suppression circuit comprises a first and second switch, and a first and second diode, coupled with the generator field coil, and wherein the voltage transient suppression circuit operates to reduce the generator output voltage transients due to sudden variations in the one or more electrical loads when the voltage regulator switched off both the first and second switches.

In another aspect, a method for controlling a vehicle electrical system that includes a generator, a voltage regulator, one or more electrical loads, and an electrical energy source is disclosed. The method comprises maintaining a voltage of the electrical energy source at a predetermined voltage above the regulation voltage, via a charging module, so as to reduce the generator output voltage transients due to sudden variations in the one or more electrical loads. Preferably, the method comprises charging the electrical energy source when the voltage of the electrical energy source falls below the predetermined voltage. Preferably, the method comprises maintaining the charge of the electrical energy source when the voltage of the electrical energy source is at the predetermined voltage. Preferably, the method comprises discharging the electrical energy source when the voltage of the electrical energy source is above the predetermined voltage.

In another aspect, a method for controlling a vehicle electrical system that includes a generator, a voltage regulator, one or more electrical loads, and an electrical energy source is disclosed. The method comprises maintaining a voltage of the electrical energy source at a predetermined voltage above the regulation voltage, via a charging module, so as to reduce the generator output voltage transients due to sudden variations in the one or more electrical loads. Preferably, the method further comprises one of storing the electrical energy of the field coil in the electrical energy source and providing the electrical energy in the electrical energy source to the field coil, when the output voltage of the generator differs from the regulation voltage.

In another aspect, a method for controlling a generator coupled with a voltage regulator and an electrical energy source, said voltage regulator operative to regulate the generator output voltage at a regulation voltage. The method comprises measuring a voltage of the electrical energy source, via a first sense line, and applying one or more control signals to a charging module, via one or more control lines, to maintain the voltage of the electrical energy source at a predetermined voltage that is above the regulation voltage so as to reduce the generator output voltage transients due to sudden variations in the one or more electrical loads. Preferably, the charging module comprises two switches and the electrical energy source is a capacitor. In one instance, the method comprises switching off the first switch and switching on the second switch when the voltage of the capacitor is below the predetermined voltage. In another instance, the method comprises switching on the first switch and switching off the second switch when the voltage of the capacitor is at the predetermined voltage. In another instance, the method comprises switching on both switches when the voltage of the capacitor is above the predetermined voltage.

In another aspect, a method for controlling a generator coupled with a voltage regulator and an electrical energy source, said voltage regulator operative to regulate the generator output voltage at a regulation voltage. The method comprises measuring a voltage of the electrical energy source, via a first sense line, and applying one or more control signals to a charging module, via one or more control lines, to maintain the voltage of the electrical energy source at a predetermined voltage that is above the regulation voltage so as to reduce the generator output voltage transients due to sudden variations in the one or more electrical loads. Preferably, the charging module comprises two switches and the electrical energy source is a capacitor. Preferably the method further comprises measuring the output voltage of the generator, via a second sense line, switching on the second switch when the output voltage of the generator differs from the regulation voltage.

In another aspect, a method for controlling a generator coupled with a voltage regulator and an electrical energy source, said voltage regulator operative to regulate the generator output voltage at a regulation voltage. The method comprises measuring a voltage of the electrical energy source, via a first sense line, and applying one or more control signals to a charging module, via one or more control lines, to maintain the voltage of the electrical energy source at a predetermined voltage that is above the regulation voltage so as to reduce the generator output voltage transients due to sudden variations in the one or more electrical loads. Preferably, the charging module comprises a switch, a diode, and a resistor. In one instance, the method comprises switching off the switch when the voltage of the capacitor is below the predetermined voltage. In another instance, the method comprises switching on the switch when the voltage of the capacitor is at the predetermined voltage.

In another aspect, a method for suppressing voltage transients via a voltage transient suppression in a voltage regulator is disclosed wherein the regulator is configured to regulate the generator voltage at a regulation voltage and further to reduce the generator output voltage transients due to sudden variations in the one or more electrical loads coupled with the generator. Preferably, the voltage transient suppression circuit comprises a first and second switch, and a first and second diode, coupled with the generator field coil. The method comprises switching on/off electrical current flow between a field coil in the generator and a voltage source, via the first and second switch, and directing the electrical current between the field coil and voltage source via the first and second diode, so as to suppress voltage transients of the generator output voltage when the voltage regulator switches off both the first and second switches.

DETAILED DESCRIPTION OF THE PRESENTLY PREFERRED EMBODIMENTS

Figure 1:
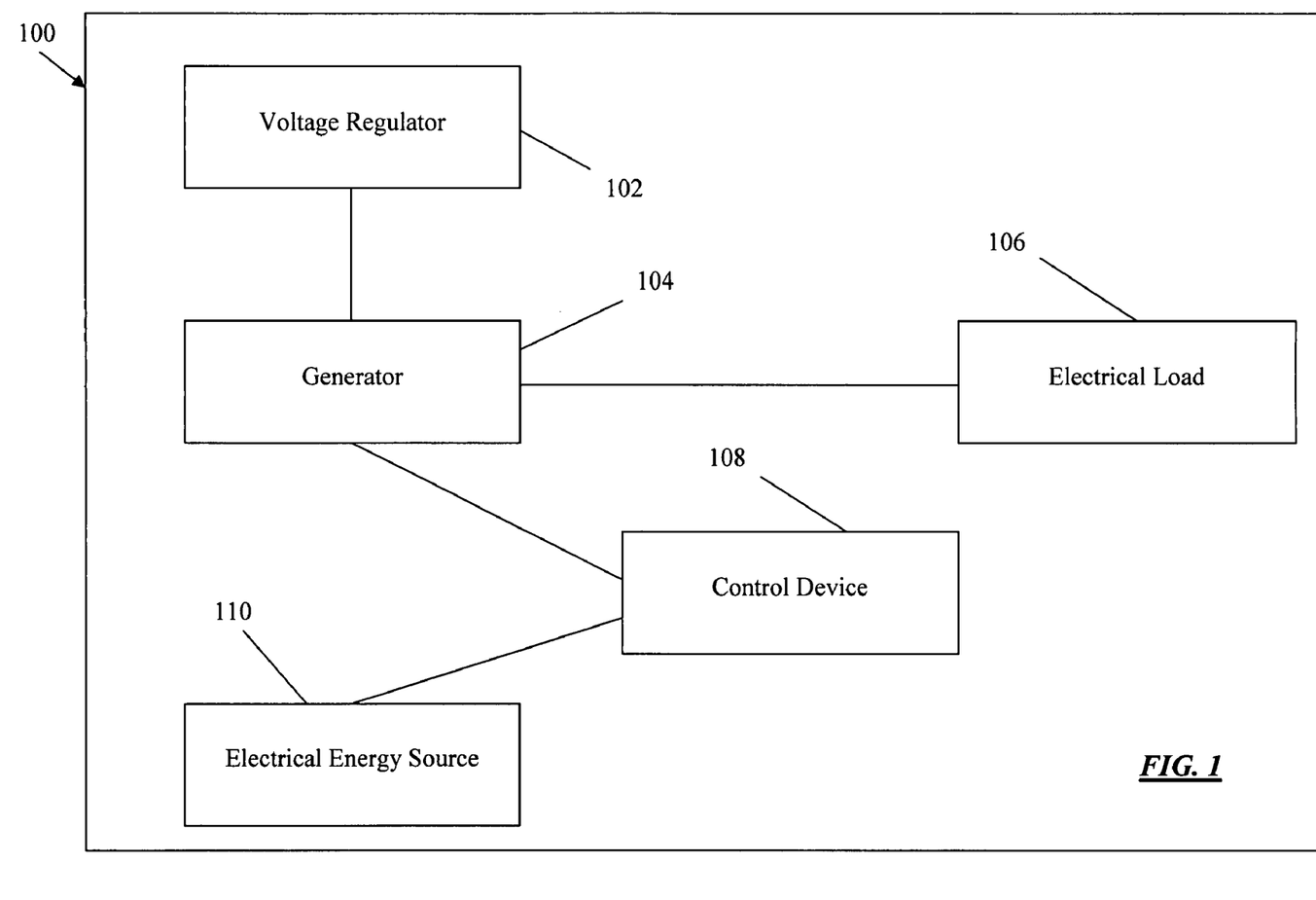
FIG. 1 shows a block diagram of a vehicle electrical system comprising a generator, a voltage regulator, electrical energy source, electrical load, and control device according to a preferred embodiment.

FIG. 1 depicts a block diagram of a preferred embodiment of a vehicle electrical system 100, including a generator 104, a voltage regulator 102, electrical load 106, electrical energy source 110, and a control device 108. The control device 108 is connected to and in communication with the generator 104 and electrical energy source 110. The voltage regulator 102 operates to maintain the generator output voltage at a constant voltage as the speed of the generator 104 and electrical load 106 vary. The electrical load 106 represents electrical loads by electrical components which may comprise a heating element, an air conditioning unit, a compressor, a cooling fan, headlights, a battery, or a pump, to name a few examples. As these electrical loads are applied and removed from the generator 104, the system voltage experiences dips and spikes that may last for hundreds of milliseconds. The intensity of these voltage transients increases as a function of the electrical load and speed of the generator 104. The control device 108 comprises a charging module (not shown) and it operates to maintain the voltage of the electrical energy source 110 at a predetermined voltage that is above the regulation voltage. As such, the electrical energy source 110 may be used to either store the excess electrical energy of the generator field coil or to provide the field coil with electrical energy from the electrical energy source 110 so as to reduce the voltage transients associated with sudden connection and disconnection of the electrical load 106.

In one embodiment, the generator 104 is a brushless alternator having a field coil (not shown) that generates a magnetic field when a field current passes through the field coil. The magnetic field interacts with one or more stator windings in the generator (not shown), inducing voltage across the stators which, in turn, produce the generator output current for consumption by the electrical load 106. The voltage regulator 102 is coupled with the generator field coil and operates to regulate the system voltage at a regulation voltage, for instance 28 V, by switching on/off the field coil, thereby, varying the average value of the field current. The voltage regulator 102 comprises one or more switches to accomplish this. In one instance, the voltage regulator 102 may utilize two switches. A first switch is disposed between one end of the field coil and a voltage source, such as a battery (not shown), and a second switch is disposed between the other end of the field coil and the voltage source. The voltage regulator 102 senses the output voltage of the generator 104 and applies a control signal to switch on/off the first switch to maintain the system voltage at the regulation voltage, and applies another control signal to switch off the second switch in response to a generator output voltage that is above a threshold value for a predetermined time interval. Following this over voltage condition and upon a system reset, the regulator switches on the second switch to continue normal operation. In this two-switch configuration, the voltage regulator 102 uses the first switch to regulate the system voltage at the regulation voltage, and the second switch to further prevent over voltage conditions that may occur when an electrical load is suddenly disconnected.

The control device 108 is coupled with the electrical energy source 110, for instance a capacitor, via a charging module (not shown). In one instance, the charging module comprises two switches, similar to those used by the voltage regulator 102. The control device 108 utilizes the switches to maintain the voltage of the electrical energy source 110 at a predetermined voltage level that is above the regulation voltage. Maintaining the voltage level of the electrical energy source 110 above the regulation voltage is advantageous when storing the excess electrical energy of the field coil in the electrical energy source 110 and when providing electrical energy from the electrical energy source 110 to the field coil. The control device 108 further comprises a controller (not shown), such as a microcontroller, that senses the voltage of the electrical energy source 110 and operates the charging module to maintain the voltage at the predetermined voltage level. As stated above, the electrical energy source 110 may be utilized to reduce the voltage transients due to sudden connection/disconnection of the electrical load 106.

According to one preferred embodiment, the control device 108 may further be configured to measure an output voltage of the generator 104 and operate the charging module to directly suppress the voltage transients due to sudden connection/disconnection of the electrical load 106. The control device 108 senses the output voltage of the generator 104 and operates the charging module so as to store the excess electrical energy of the field coil in the electrical energy source 110 when an over voltage condition is detected, and to provide electrical energy from the electrical energy source 110 to the field coil when an under voltage condition is detected. In another embodiment, a separate electrical circuit may be utilized to sense the voltage variations of the output voltage of the generator 104 and manipulate the charging module so as to suppress the generator output voltage transients due to sudden variations in the electrical load 106. In yet another embodiment, the control device 108 may be configured to further function as a voltage regulator, eliminating the need for a separate voltage regulator such as the voltage regulator 102. In this configuration, the control device 108 comprises a charging module that includes four switches. Two switches are utilized to regulate the system voltage at the regulation voltage, and the other two switches are used to maintain the voltage of the electrical energy source 106 above the regulation voltage. Additionally, the control device 108 may further be configured to operate the latter two switches to either store the electrical energy of the field coil in the electrical energy source 110 when an over voltage condition is detected, or provide electrical energy from the electrical energy source 110 to the field coil when an under voltage condition is detected, thereby improving the quality of the power delivered to the vehicle electrical system.

Figure 2:
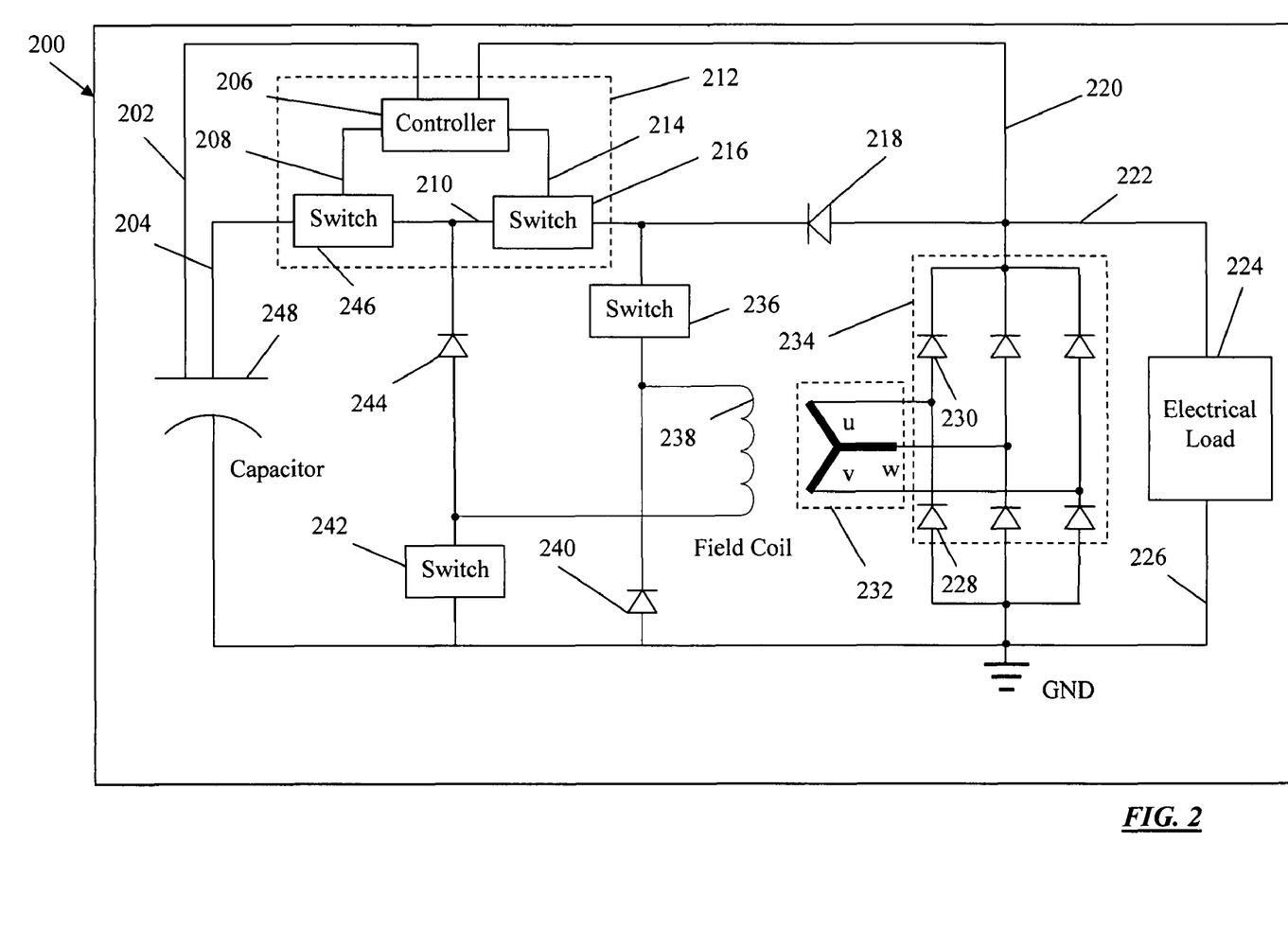
FIG. 2 shows a schematic diagram of the electrical connections between the various components within the vehicle electrical system of FIG. 1 according to a preferred embodiment.

FIG. 2 shows a schematic diagram 200 of the electrical connections between the various components within the vehicle electrical system of FIG. 1 according to a preferred embodiment. In this configuration, a generator, such as the generator 104, comprises a field coil 238, three-phase stator windings 232, and a full-wave rectifier circuit 234. The generator produces electrical current at its output 222, through an electrical load 224, to ground at 226. The electrical load 224 represents one or more electrical loads by electrical components such as those mentioned above. A voltage regulator, such as the voltage regulator 102, is represented by two switches 236 and 242, and a control device 212, such as the control device 108, comprises a controller 206 and a charging module which includes a first switch 216 and a second switch 246. The controller 206 is coupled and in communication with the first and second switches via lines 214 and 208. The control device 212 operates to maintain the voltage of the electrical energy source 248, a capacitor in this preferred embodiment, at a predetermined voltage that is above the regulation voltage, and further to one of store the electrical energy of the field coil 238 in the electrical energy source 248 and provide the electrical energy in the electrical energy source 248 to the field coil 238, in response to variations of the electrical load 224.

The generator, as represented by the field coil 238, three-phase stator windings 232, and the full-waive rectifier circuit 234, is coupled with the electrical load 224. The generator may be a brushless alternator. For a single stator brushless alternator, as in this embodiment, a rotor is used as a means to vary the magnetic field through the stator windings 232, thereby creating an alternating current that is rectified via the full-wave rectifier circuit 234 and fed to the electrical load 224. The output voltage of the alternator is controlled via the voltage regulator. The magnetic field created by the field coil 238 is a function of the field current through the field coil 238. As the electrical load 224 varies, the field current through the field coil 238 also varies. The higher the value of the electrical load 224, the higher the field current. As is known to artisans of ordinary skill, the field current through the field coil 238 does not follow the voltage across the field coil 238 instantaneously. Furthermore, there is a finite time associated with the dissipation of the field current through the field coil 238 which depends on the resistance R and inductance L of the field coil 238.

In a situation where the generator is operating at relatively high RPM and delivering high electrical current to the electrical load 224, there may occur a sudden reduction in the electrical load 224. Although, the regulator, as discussed more fully below, responses to this event by virtually disconnecting the field coil 238 from the generator, vis-à-vis, switching off switches 236 and 242, the decay of the field current through the field coil 238 may take hundreds of milliseconds which in most applications is unacceptably long. Similarly, in a situation where the electrical load 224 suddenly increases, the field coil 238 is switched on and remains on until the voltage reaches the regulation voltage. However, during this period, which may last for hundreds of milliseconds, the system voltage is below the regulation voltage. These two events, namely, over voltage and under voltage conditions are present, even in a vehicle electrical system that includes one or more batteries. In a batteryless environment, these voltage spikes and dips are of even greater intensity. These voltage transients are the most potentially destructive transients in the vehicle electrical system.

The voltage regulator operates the two switches 236 and 242 to regulate the output voltage of the generator at a regulation voltage, for instance 28 V, and to protect the vehicle electrical system from over voltage conditions. The switches may operate by analog or digital logic, known to artisans of ordinary skill. Although, only one switch may be utilized for regulation purposes, in this configuration, switch 236 is utilized to connect one side of the field coil 238 to generator output at 222 through a diode 218, and switch 242 is used to connect the other end of the field coil 238 to the ground 226.

The switches 236 and 242 are interchangeable, meaning that either could operate as either a regulating switch or an over voltage switch, but in this configuration, the switch 242 is switched on/off in response to the electrical current demand by the electrical load 224, and the switch 236 is normally on but is switched off only when a sudden reduction in the electrical load 224 creates an over voltage condition. Thus the switch 242 is designed to regulate the output voltage of the generator and the switch 236 is incorporated to respond to over voltage conditions. Diodes 240 and 244 are utilized to properly direct the field current through the field coil 238, the latter, known to skilled artisans as the fly-back diode, operates to direct the field current through the filed coil 238 during the periods when switch 242 is off.

During normal operation, the switch 236 is switch on and switch 242 is switched on/off which varies the filed current in the field coil 238 in accordance with the electrical current demand by the electrical load 224. Different methods of voltage regulation may be implemented, such as those described in Jabaji, U.S. Pat. Nos. 7,352,157, 7,276,804, and 5,907,233. An over voltage condition is signified by a voltage level that is above a threshold value and which lasts for a predetermined time period. When an over voltage condition is detected, both switches 236 and 242 are switched off.

The electrical energy source 248, in this embodiment a capacitor, is utilized to rapidly decrease or increase the field current in the field coil 238. As stated above, the generator output voltage is directly proportional to the field current. Faster decay of the field current is equivalent to faster suppression of the generator over voltage condition. Similarly, rapid increase in the field current is equivalent to faster suppression of the generator under voltage condition. In effect, the capacitor 248 is utilized to store excess electrical energy from the field coil 238 in the capacitor 248 when an over voltage condition occurs, and to provide electrical energy to the field coil 238 when an under voltage condition occurs.

In a conventional circuit, such as the one described in Isurin et. al (see above), the capacitor 248 is connected to the field coil 238 and it operates to slow the flow of current through the field coil 238. In Isurin, the voltage of the capacitor 248 is determined by the system voltage. Therefore, at the onset of a sudden decrease in the electrical load 224, the filed current through the field coil 238 must pass through the capacitor 248 whose voltage level is that of the system voltage which is regulated at the regulation voltage, in this example 28 V.

In the present invention, the control device 212 utilizes switches 246 and 216 in order to maintain the voltage of the electrical energy source 248 at a predetermined voltage that is above the regulation voltage. For instance, the control device 212 may be configured to maintain the voltage of the capacitor 248 at 100 V when the system voltage is regulated at 28 V. When the electrical load 224 is suddenly decreased and switches 236 and 242 are switched off, the field current through the field coil 238 encounters the capacitor 248 whose voltage is at 100 V. The resistance to passage of field current through this high-voltage capacitor is substantially higher than the resistance in a conventional circuit such as the Isurin circuit. Consequently, the field current through the field coil 238 decays much faster, hence, suppressing over voltage conditions much more rapidly.

An additional benefit of the present invention is its capacity to suppress voltage transients due to a sudden increase in the electrical load 224. In this case, the capacitor 248 whose voltage is above the regulation voltage can provide electrical energy to the field coil 238 much more rapidly than a generator or a voltage source such as a battery could. When a sudden increase in the electrical load 224 occurs, the capacitor 248 can provide the field coil 238 with additional electrical energy, thereby, rapidly increasing the field current through the field coil 238. Consequently, the field current through the field coil 238 flows much faster, hence, suppressing under voltage conditions much quicker.

The control device 212 utilizes a controller 206 to control the switches 216 and 246. The controller may be analog or digital such as a microprocessor. In one preferred embodiment, the microprocessor is a 68C08 processor having internal flash memory available from Motorola, Inc. of Schaumburg, Ill. It is contemplated that the processor may be a combination of individual discrete or separate integrated circuits packaged in a single housing or it may be fabricated in a single integrated circuit.

Utilizing the vehicle electrical system of FIG. 2, one embodiment of the operation of the control device 212 is now described. Following power up, the switch 236 is switched on and the switch 242 switches on/off according to the current demand by the electrical load 224. The controller 212 switches on the switch 246 and switches off the switch 216 in order to charge the capacitor 248. During the period when the switch 242 is on, the field current flows through the switch 236, the field coil 238, and switch 242. During the period when the switch 242 is off, the field current flows through the switch 236, the field coil 238, the diode 244, the switch 246, and the capacitor 248. As a result, during this off period of the regulating switch 242, the capacitor 248 is charged and its voltage rises above the regulation or system voltage. The controller 206 senses the voltage of the capacitor 248 via a sense line 202. When the voltage of the capacitor 248 reaches a predetermined voltage, for instance 100 V, the controller 206 switches on the switch 216 and switches off the switch 246. In this manner, the controller 206 maintains the charge of the capacitor 248 to a voltage that is above the regulating voltage. The controller 206 switches on both switches 216 and 246 in order to discharge the capacitor when the voltage of the capacitor rises above the predetermined voltage, for instance 150 V. This occurs when the field current passes through the capacitor 248 during an over voltage event. As such, the controller 206 ascertains that the voltage of the capacitor 248 is maintained at the predetermined voltage. The capacitor 248 can now be utilized to either store excess electrical energy from the field coil 238, hence, rapidly decaying the field current, or provide electrical energy from the capacitor 248 to the field coil 238, hence, rapidly increasing the field current through the field coil 238, in order to suppress over voltage and under voltage transients, respectively.

The controller 206 may further be configured to utilize the capacitor 248 to directly respond to over voltage and under voltage conditions. Specifically, the controller 206 may be configured to measure the voltage of the generator via a sense line 220. When a sudden change in the electrical load 224 occurs, the output voltage of the generator differs from the regulation voltage, hence, either an over voltage or an under voltage condition exists. When an over voltage condition is detected, the controller 206 switches on the switch 246 regardless of the state of the switch 216 because during an over voltage condition the switches 236 and 242 are switched off. Accordingly, the field current must pass through the capacitor 248 which causes the field current to decay much faster and, hence, suppressing the over voltage condition much quicker. When an under voltage condition is detected, the controller 206 switches on both switches 246 and 216. Accordingly, the capacitor 248 adds electrical current to the field current and, hence, suppressing the under voltage condition much faster.

Figure 3:
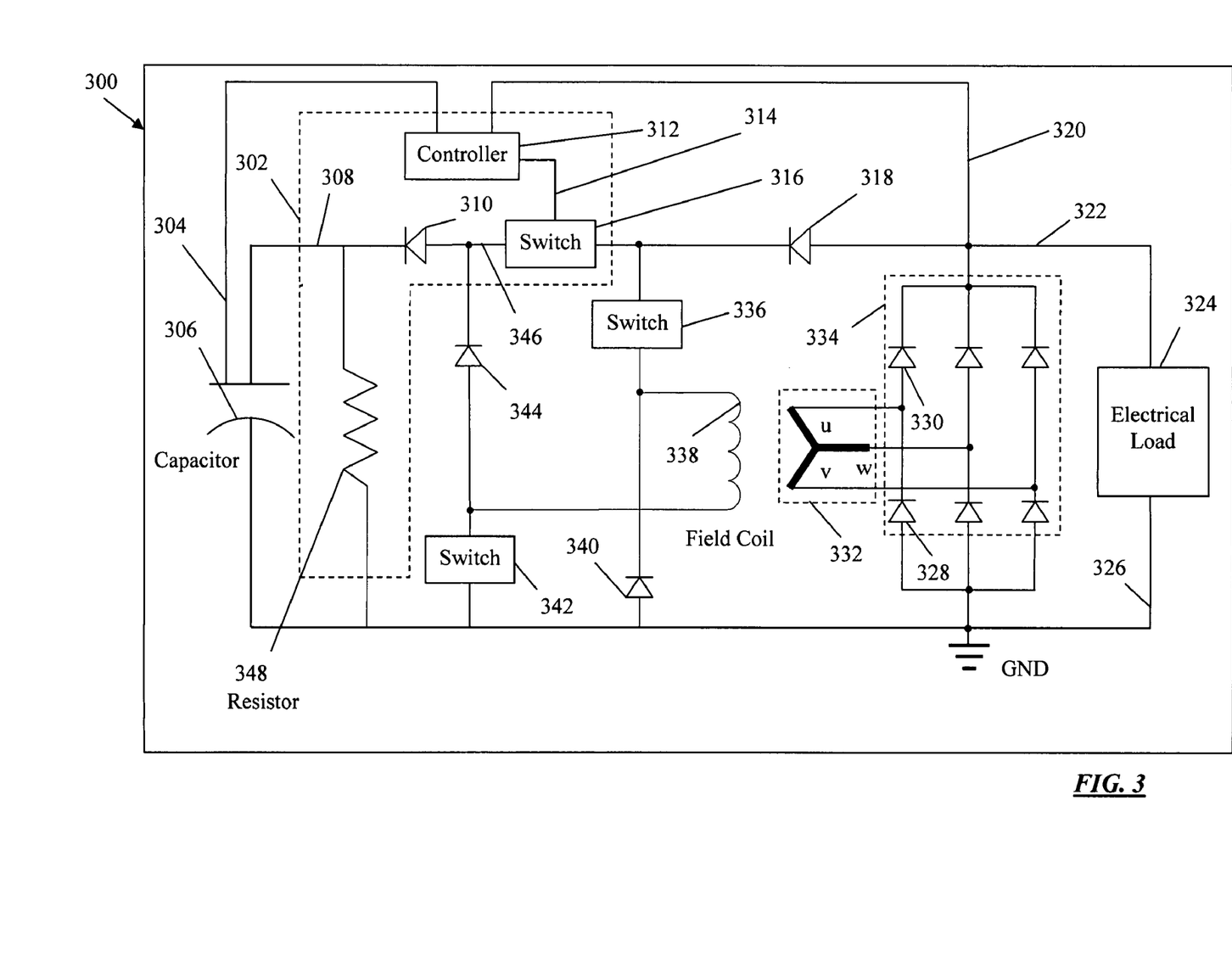
FIG. 3 shows a schematic diagram of the electrical connections between the various components within the vehicle electrical system of FIG. 1 according to a preferred embodiment.

FIG. 3 shows a schematic diagram 300 of the electrical connections between the various components within the vehicle electrical system of FIG. 1 according to a preferred embodiment. In this configuration, a generator, such as the generator 104, comprises a field coil 338, three-phase stator windings 332, and a full-wave rectifier circuit 334. The generator produces electrical current at its output 322, through an electrical load 324, to ground at 326. The electrical load 324 represents one or more electrical loads by electrical components such as those mentioned above. A voltage regulator, such as the voltage regulator 102, is represented by two switches 336 and 342, and a control device 302, such as the control device 108, comprises a controller 312 and a charging module which includes a first switch 316, a diode 310, and a resistor 348. The controller 312 is coupled and in communication with the switch 316 via line 314. The control device 302 operates to maintain the voltage of the electrical energy source 306, a capacitor in this preferred embodiment, at a predetermined voltage that is above the regulation voltage, and further to store the electrical energy of the field coil 338 in the electrical energy source 306, in response to variations of the electrical load 324.

In this embodiment, the operation of the generator and voltage regulator is similar to those discussed in relation to FIG. 2. The control device 302 utilizes the switch 316, diode 310, and resistor 348 in order to maintain the voltage of the electrical energy source 306 at a predetermined voltage that is above the regulation voltage. For instance, the control device 302 may be configured to maintain the voltage of the capacitor 306 at 50 V when the system voltage is regulated at 14 V. When the electrical load 324 is suddenly decreased and switches 336 and 342 are switched off, the field current through the field coil 338 encounters the capacitor 306 whose voltage is at 50 V. The resistance to passage of field current through this high-voltage capacitor is substantially higher than the resistance in a conventional circuit such as the Isurin circuit. Consequently, the field current through the field coil 338 decays much faster, hence, suppressing over voltage conditions much more rapidly.

Utilizing the vehicle electrical system of FIG. 3, one embodiment of the operation of the control device 302 is now described. Following power up, the switch 336 is switched on and the switch 342 switches on/off according to the current demand by the electrical load 324. The controller 302 switches off the switch 316 in order to charge the capacitor 306. During the period when the switch 342 is on, the field current flows through the switch 336, the field coil 338, and switch 342. During the period when the switch 342 is off, the field current flows through the switch 336, the field coil 338, the diode 344, the diode 310, and the capacitor 306. As a result, during this off period of the regulating switch 342, the capacitor 306 is charged and its voltage rises above the regulation or system voltage. The controller 312 senses the voltage of the capacitor 306 via a sense line 304. When the voltage of the capacitor 306 reaches a predetermined voltage, for instance 50 V, the controller 312 switches on the switch 316. In this manner, the controller 312 maintains the charge of the capacitor 306 to a voltage that is above the regulating voltage. The capacitor 306 can now be utilized to store excess electrical energy from the field coil 338, hence, rapidly decaying the field current, improving the detrimental effects of over voltage conditions, respectively.

The controller 312 may further be configured to utilize the capacitor 306 to directly respond to over voltage conditions. Specifically, the controller 312 may be configured to measure the voltage of the generator via a sense line 320. When a sudden change in the electrical load 324 occurs, the output voltage of the generator differs from the regulation voltage, hence, either an over voltage or an under voltage condition exists. When an over voltage condition is detected, the controller 312 switches off the switch 316 because during an over voltage condition the switches 336 and 342 are switched off. Accordingly, the field current must pass through the capacitor 306 which causes the field current to decay much faster and, hence, suppressing the over voltage condition much quicker.

Figure 4:
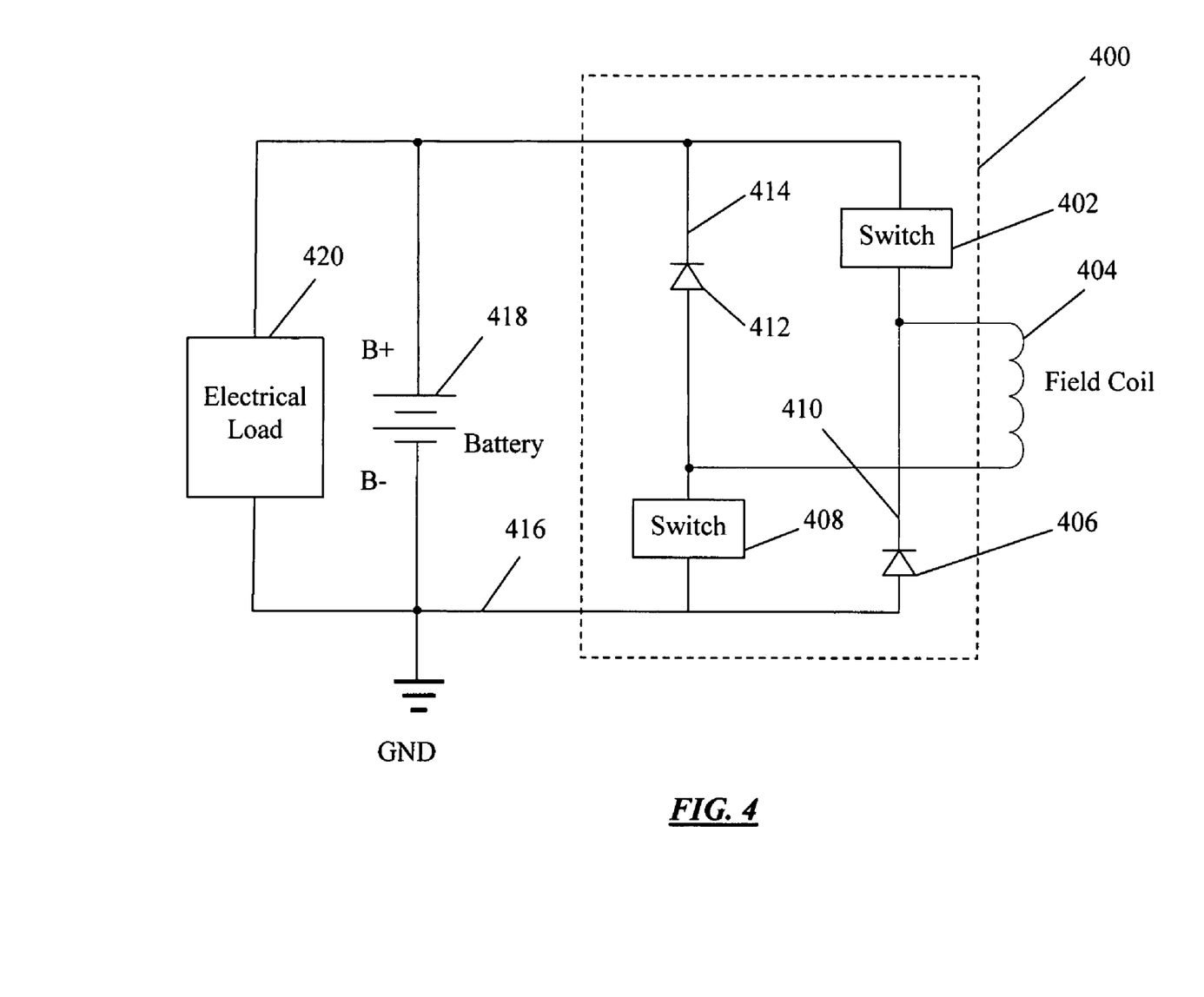
FIG. 4 shows a schematic diagram of a voltage transient suppression circuit in a voltage regulator according to a preferred embodiment.

FIG. 4 shows a schematic diagram of a voltage transient suppression circuit 400 that may be implemented in a voltage regulator according to a preferred embodiment. The circuit 400 provides an alternative to those described above. Specifically, the circuit 400 comprises a first switch 402, a second switch 408, a first diode 412, and a second diode 406. The circuit 400 may be utilized in a conventional regulator circuit to improve over voltage conditions.

Utilizing FIG. 4, one embodiment of the operation of the circuit 400 is now described. During normal operation, the circuit 400 operates similar to a conventional voltage regulator circuit. The switch 402 is switched on and the switch 408 switches on/off according to the current demand by the electrical load 420. During the period when the switch 408 is on, the field current flows through the switch 402, the field coil 404, and switch 408. During the period when the switch 408 is off, the field current flows through the switch 402, the field coil 404, and the diode 312. When an over voltage condition occurs, the switches 402 and 408 are switched off. The field current must go through the field coil 404, diode 414, electrical energy source, in this embodiment, a battery 418, and diode 406. In a batteryless embodiment, the battery 418 may be substituted with a capacitor. Accordingly, the field current must pass through the battery 418 which causes the field current to decay much faster and, hence, suppressing the over voltage condition much quicker.

Figure 5:
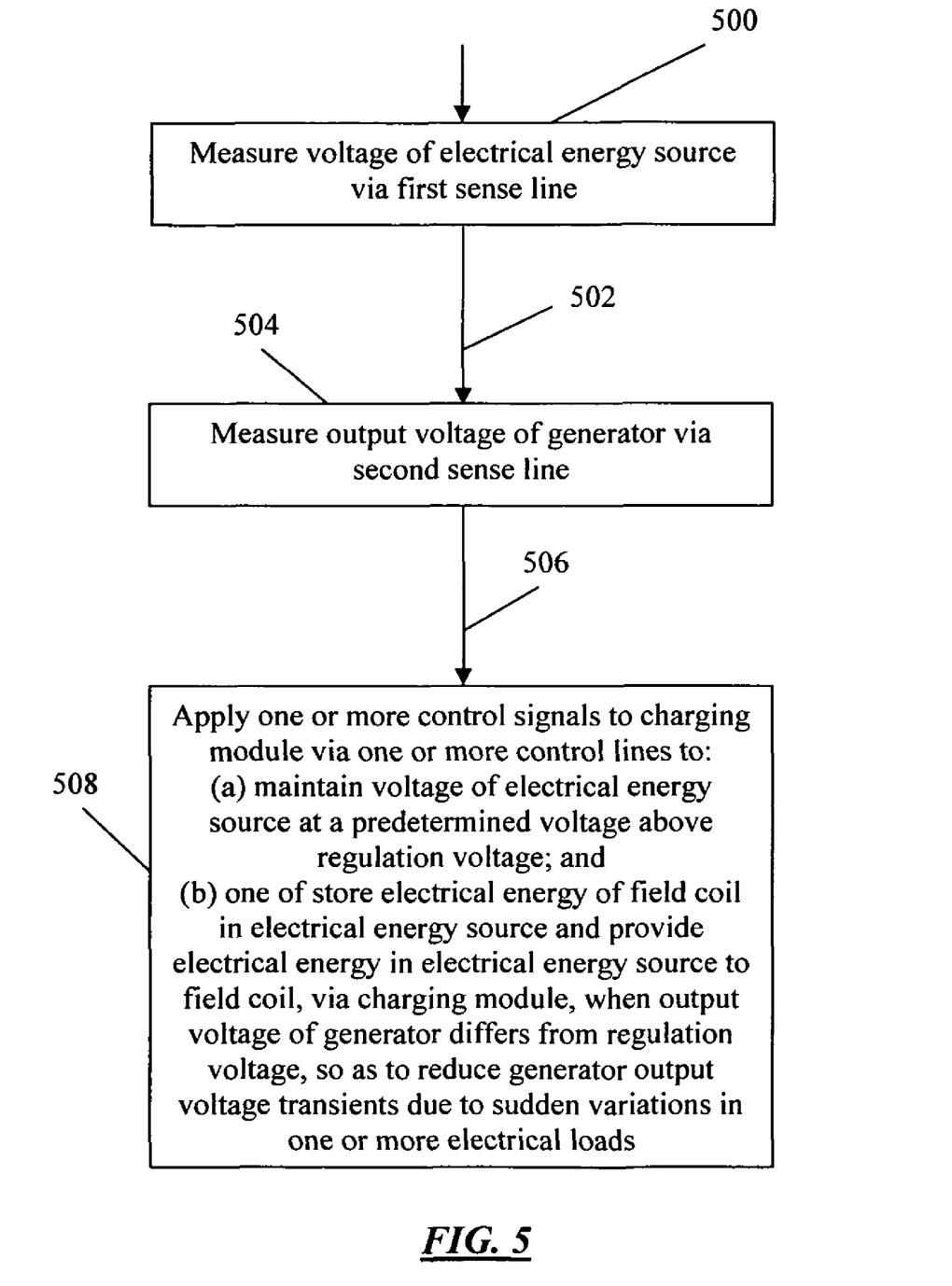
FIG. 5 is a flow diagram of one preferred method of operation of the control device of FIGS. 1 and 2.

FIG. 5 is a flow diagram of one preferred method of operation of the control device of FIGS. 1 and 2. According to this embodiment, the method comprises measuring the voltage of the electrical energy source at 500, via a first sense line, measuring the voltage of the generator at 504, via a second sense line, applying one or more control signals to the charging module at 508, via one or more control lines. Specifically, the control signals are applied to the charging module to (a) maintain the voltage of the electrical energy source at a predetermined voltage that is above the regulation voltage, and (b) to one of store the electrical energy of the field coil in the electrical energy source to suppress over voltage conditions, and to provide electrical energy from the electrical energy source to the field coil to suppress under voltage conditions.

Figure 6:
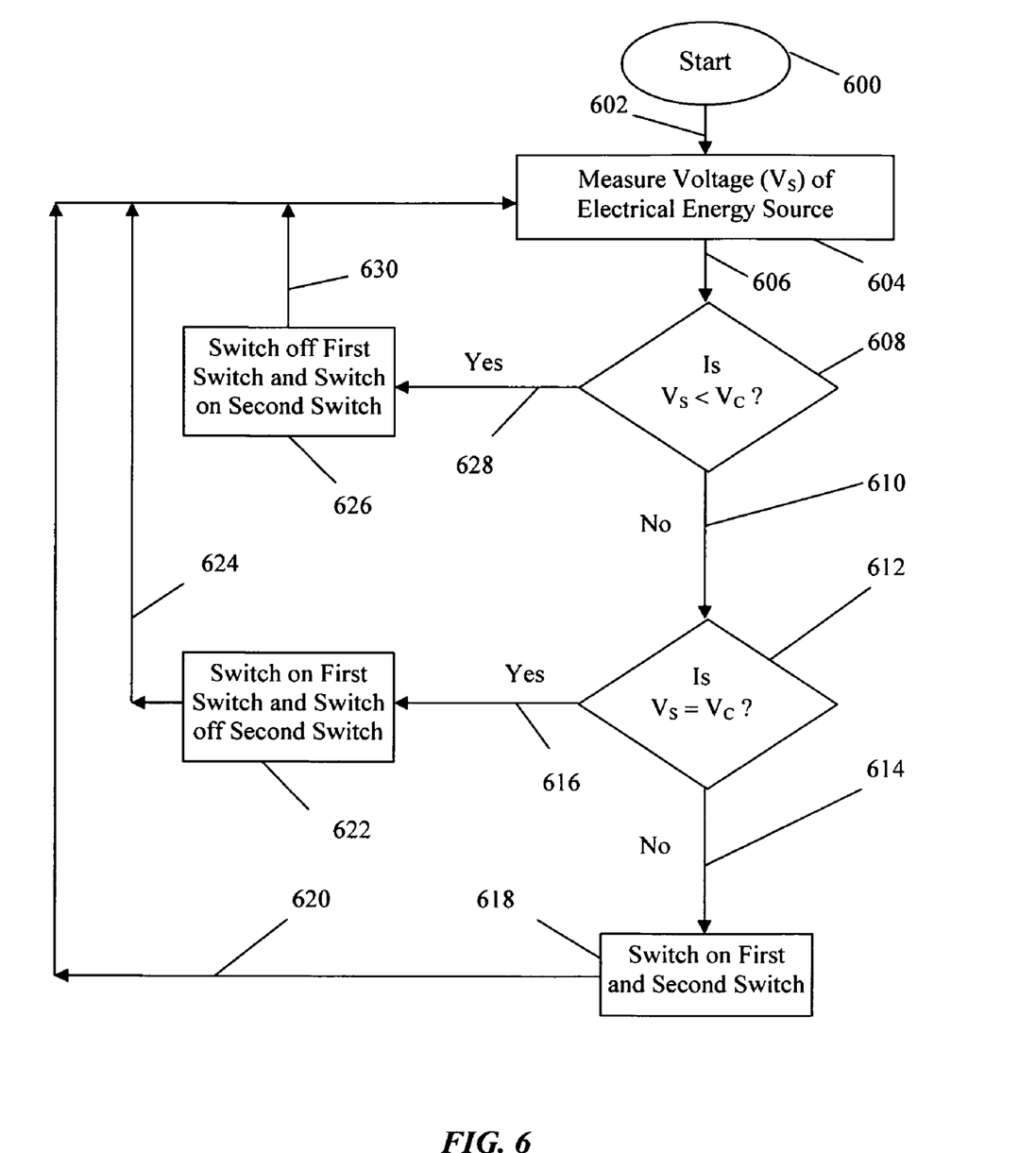
FIG. 6 is a flow diagram of one preferred method of operation of the control device of FIGS. 1 and 2 further illustrating the operation of the charging module included in the control device.

FIG. 6 is a flow diagram of one preferred method of operation of the control device of FIGS. 1 and 2 further illustrating the operation of the charging module included in the control device. Upon power up at 600, the controller 206 measures a voltage $V_S$ of the electrical energy source 248 at 604. The voltage $V_S$ is compared with a predetermined voltage $V_C$ at 608. If the voltage $V_S$ is less than $V_C$ the controller 206 is branched at 628 to switch off the first switch 216 and switch on the second switch 246 at 626, where $V_C$ is a predetermined voltage that is above the regulation voltage. The controller 206 then continues at 630 to measure the voltage $V_S$ of the electrical energy source 248 at 604. If the voltage $V_S$ is not less than $V_C$, a further comparison is performed at 612. If $V_S$ is equal to $V_C$, the controller 206 is branched at 616 to switch on the first switch 216 and switch off the second switch 246 at 622. In order to make this equality comparison more robust, a skilled artisan of ordinary skill may implement a routine to compare $V_S$ to a range of $V_C$, such as $V_{C1}$ and $V_{C2}$. The controller 206 continues at 624 to measure the voltage $V_S$ of the electrical energy source 248 at 604. If $V_S$ is not equal to $V_C$, the controller 206 is branched at 614 to switch on the first and second switch 216 and 246 at 618 and the controller 206 continues at 620 to measure the voltage $V_S$ of the electrical energy source 248 at 604.

Figure 7:
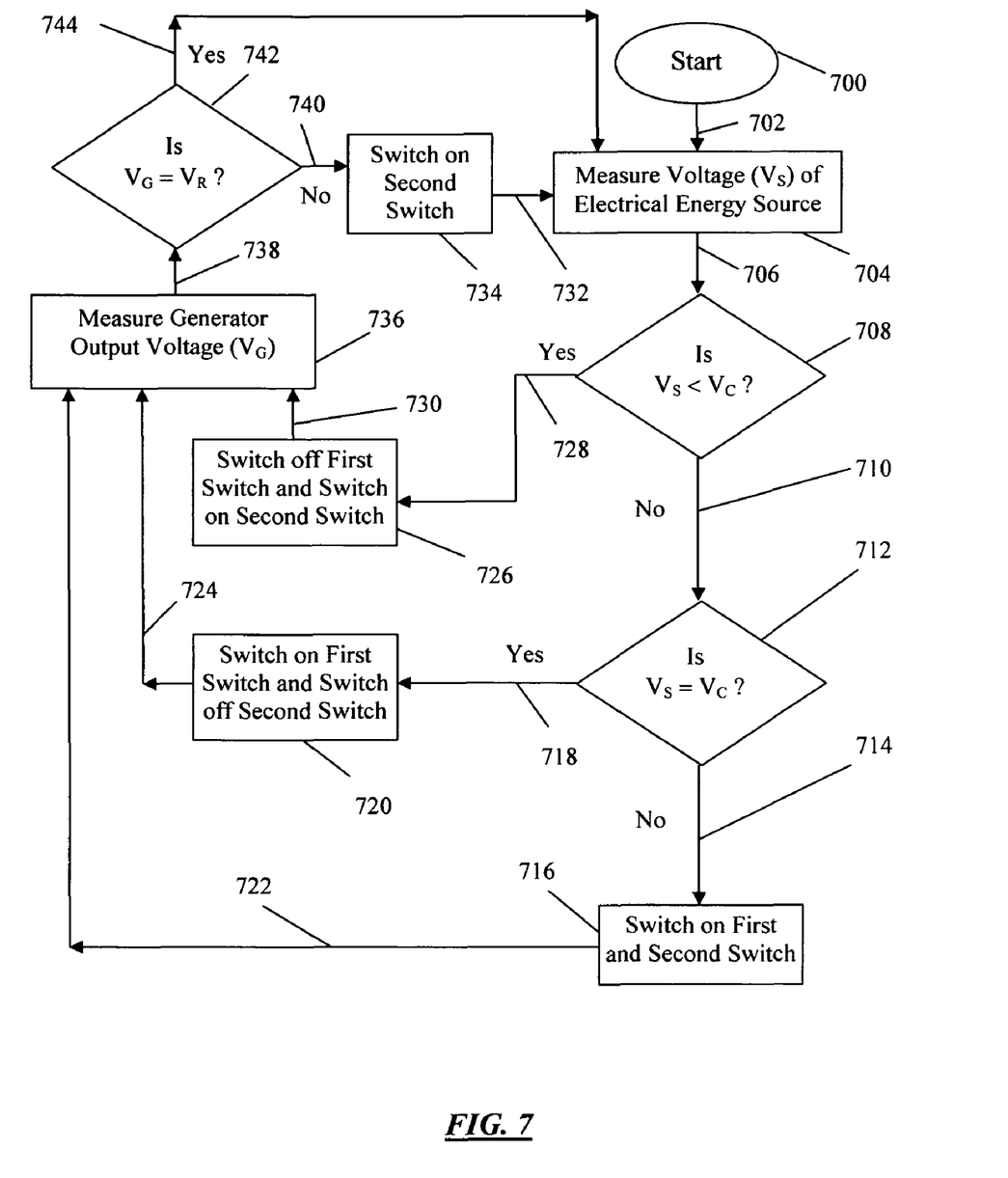
FIG. 7 is a flow diagram of one preferred method of operation of the control device of FIGS. 1 and 2 further illustrating the operation of the charging module included in the control device and utilization of the electrical energy source in suppressing voltage transients.

FIG. 7 is a flow diagram of one preferred method of operation of the control device of FIGS. 1 and 2 further illustrating the operation of the charging module included in the control device and utilization of the electrical energy source in suppressing voltage transients. Upon power up at 700, the controller 206 measures a voltage $V_S$ of the electrical energy source 248 at 704. The voltage $V_S$ is compared with a predetermined voltage $V_C$ at 708. If the voltage $V_S$ is less than $V_C$ the controller 206 is branched to at 728 to switch off the first switch 216 and switch on the second switch 246 at 726, where $V_C$ is a predetermined voltage that is above the regulation voltage. The controller 206 then continues at 730 to measure the output voltage $V_G$ of the generator at 736. The controller then continues at 738 and a comparison is made at 742 between the output voltage of the generator $V_G$ and the regulation voltage $V_R$. If the voltage $V_G$ is equal to $V_R$, the controller 206 branches at 744 to measure the voltage $V_S$ of the electrical energy source 248 at 704. If the voltage $V_G$ is not equal to $V_R$, the controller 206 is branched at 740 and switches on the second switch 246 at 734. The controller 206 then branches at 732 to measure the voltage $V_S$ of the electrical energy source 248 at 704.

If the voltage $V_S$ is not less than $V_C$, a further comparison is performed at 712. If $V_S$ is equal to $V_C$ the controller 206 is branched to at 718 to switch on the first switch 216 and switch off the second switch 246 at 720. The controller 206 then continues at 724 to measure the output voltage $V_G$ of the generator at 736. The controller then continues at 738 and a comparison is made at 742 between the output voltage of the generator $V_G$ and the regulation voltage $V_R$. If the voltage $V_G$ is equal to $V_R$, the controller 206 branches at 744 to measure the voltage $V_S$ of the electrical energy source 248 at 704. If the voltage $V_G$ is not equal to $V_R$, the controller 206 is branched at 740 and switches on the second switch 246 at 734. The controller 206 then branches at 732 to measure the voltage $V_S$ of the electrical energy source 248 at 704.

If the voltage $V_S$ is not equal to $V_C$, the controller 206 is branched to at 714 to switch on the first and second switches 216 and 246 at 716. The controller 206 then continues at 722 to measure the output voltage $V_G$ of the generator at 736. The controller then continues at 738 and a comparison is made at 742 between the output voltage of the generator $V_G$ and the regulation voltage $V_R$. If the voltage $V_G$ is equal to $V_R$, the controller 206 branches at 744 to measure the voltage $V_S$ of the electrical energy source 248 at 704. If the voltage $V_G$ is not equal to $V_R$, the controller 206 is branched at 740 and switches on the second switch 246 at 734. The controller 206 then branches at 732 to measure the voltage $V_S$ of the electrical energy source 248 at 704.

Figure 8:
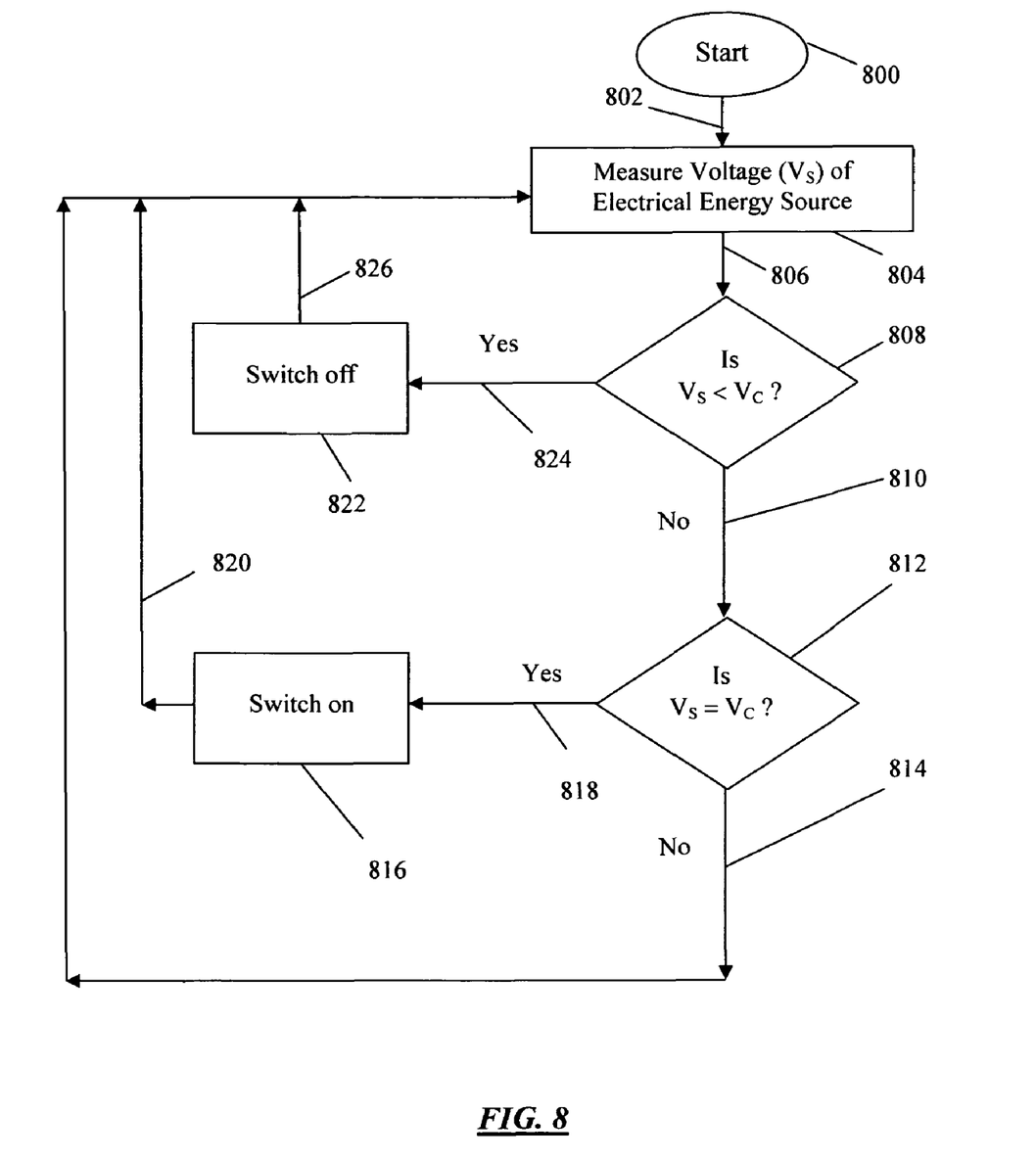
FIG. 8 is a flow diagram of one preferred method of operation of the control device of FIGS. 1 and 3 further illustrating the operation of the charging module included in the control device.

FIG. 8 is a flow diagram of one preferred method of operation of the control device of FIGS. 1 and 3 further illustrating the operation of the charging module included in the control device. Upon power up at 800, the controller 312 measures a voltage $V_S$ of the electrical energy source 306 at 804. The voltage $V_S$ is compared with a predetermined voltage $V_C$ at 808. If the voltage $V_S$ is less than $V_C$ the controller 312 is branched at 824 to switch off the switch 316 at 822, where $V_C$ is a predetermined voltage that is above the regulation voltage. The controller 312 then continues at 826 to measure the voltage $V_S$ of the electrical energy source 306 at 804. If the voltage $V_S$ is not less than $V_C$, a further comparison is performed at 812. If $V_S$ is equal to $V_C$, the controller 206 is branched at 818 to switch on the switch 316 at 816. The controller 312 continues at 820 to measure the voltage $V_S$ of the electrical energy source 306 at 804. If $V_S$ is not equal to $V_C$, the controller 312 is branched at 814 to measure the voltage $V_S$ of the electrical energy source 306 at 804.

The foregoing discloses a vehicle electrical system comprising a generator, voltage regulator, electrical energy source, and control device. The generator is coupled with one or more electrical loads and the voltage regulator operates to regulate the system voltage at a regulation voltage. Variations in the electrical loads cause voltage transients that are detrimental to the electrical components in the vehicle. The control device comprises a controller and a charging module and it operates to suppress the voltage transients by storing electrical energy of the field coil, included in the generator, in the electrical energy source, and by proving electrical energy from the electrical energy source to the field coil. The control device comprises a controller and a charging module. The charging module comprises at least one of a switch, diode, and resistor. The control device operates to maintain the voltage of the electrical energy source at a predetermined voltage that is above the regulation voltage so as to reduce the generator output voltage transients due to sudden variations in the one or more electrical loads.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A vehicle electrical system comprising:
    (a.) a generator comprising a field, coil and one or more stator windings interacting with changing magnetic flux produced by field current through said field coil and providing, electrical current to one or more electrical loads;
    (b) a voltage regulator operative to maintain an output voltage of the generator at a regulation voltage by varying the field current;
    (c) an electrical energy source operative to one of store and provide electrical energy of the field coil; and
    (d) a control device comprising a charging module electrically coupled with the generator and electrical energy source, said control device responsive to a voltage of the electrical energy source and operative to one of charge and discharge the electrical energy source, via the charging module, to maintain the voltage of the electrical energy source at a predetermined voltage above the regulation voltage, so as to reduce the generator output voltage variations.

2. The system of claim 1, wherein the control device is configured to charge the electrical energy source, via the charging module, when the voltage of the electrical energy source is below the predetermined voltage.

3. The system of claim 1, wherein the control device is configured to maintain the charge of the electrical energy source, via the charging module, when the voltage of the electrical energy source is at the predetermined voltage.

4. The system of claim 1, wherein the control device is configured to discharge the electrical energy source, via the charging module, when the voltage of the electrical energy source is above the predetermined voltage.

5. The system of claim 1, wherein the control device is further configured to one of store the electrical energy of the field coil in the electrical energy source and provide the electrical energy in the electrical energy source to the field coil, via the charging module, when the output voltage of the generator differs from the regulation voltage.

6. A vehicle electrical system comprising:
    (a) a generator comprising a field coil and one or more stator windings interacting with changing magnetic flux produced by field current through said field coil and providing electrical current to one or more electrical loads;
    (b) a voltage regulator operative to maintain an output voltage of the generator at a regulation voltage by varying the field current;

17

(c) an electrical energy source operative to one of store and provide electrical energy of the field coil; and
(d) a control device comprising a charging module electrically coupled with the generator and electrical energy source, said control device responsive to a voltage of the electrical energy source and operative to one of charge and discharge the electrical energy source, via the charging module, to:
(i) maintain the voltage of the electrical energy source at a predetermined voltage above the regulation voltage; and
(ii) one of store the electrical energy of the field coil in the electrical energy source and provide the electrical energy in the electrical energy source to the field coil when the output voltage of the generator differs from the regulation voltage, so as to reduce the generator output voltage variations.

7. A control device, coupled with a generator, a voltage regulator, and an electrical energy source, said generator comprising a field coil and one or more stator windings interacting with changing magnetic flux produced by field current through said field coil and providing electrical current to one or more electrical loads, said voltage regulator operative to maintain an output voltage of the generator at a regulation voltage by varying the field current, said electrical energy source operative to one of store and provide electrical energy of the field coil, said control device comprising:
(a) a charging module electrically coupled with the generator and electrical energy source; and
(b) a controller, coupled with the generator, electrical energy source, and charging module;
wherein the controller is configured to:
(i) measure a voltage of the electrical energy source, via a first sense line; and
(ii) apply one or more control signals to the charging module, via one or more control lines, to one of charge and discharge the electrical energy source, to maintain the voltage of the electrical energy source at a predetermined voltage that is above the regulation voltage, so as to reduce the generator output voltage-variations.

8. The control device of claim 7, wherein the charging module comprises at least one of a switch, a diode, and a resistor, and wherein the electrical energy source is a capacitor.

9. The control device of claim 7, wherein the charging module comprises a first and a second switch and wherein the controller is configured to switch off the first switch and switch on the second switch when the voltage of the electrical energy source is below the predetermined voltage.

10. The control device of claim 7, wherein the charging module comprises a first and a second switch and wherein the controller is configured to switch on the first switch and switch off the second switch when the voltage of the electrical energy source is at the predetermined voltage.

11. The control device of claim 7, wherein the charging module comprises a first and a second switch and wherein the controller is configured to switch on the first and second switch when the voltage of the electrical energy source is above the predetermined voltage.

12. The control device of claim 7, wherein the charging module comprises a first and a second switch and wherein the controller is further configured to measure the output voltage of the generator, via a second sense line, and to switch on at least one of the first and second switch when the output voltage of the generator differs from the regulation voltage.

13. The control device of claim 7, wherein the charging module comprises a switch, a diode, and a resistor and wherein the controller is configured to switch off the switch when the voltage of the electrical energy source is below the predetermined voltage.

14. The control device of claim 7, wherein the charging module comprises a switch, a diode, and a resistor and wherein the controller is configured to switch on the switch when the voltage of the electrical energy source is at the predetermined voltage.

15. The control device of claim 7, wherein the charging module comprises a switch, a diode, and a resistor and wherein the controller is further configured to measure the output voltage of the generator, via a second sense line, and to switch off the switch when the output voltage of the generator differs from the regulation voltage.

16. A method for controlling a vehicle electrical system, said system comprising:
(a) a generator comprising a field coil and one or more stator windings interacting with changing magnetic flux produced by field current through said field coil and providing electrical current to one or more electrical loads;
(b) a voltage regulator operative, to maintain an output voltage of the generator at a regulation voltage by varying the field current;
(c) an electrical energy source operative to one of store and provide electrical energy of the field coil;
said method, comprising:
(i) maintaining a voltage of the electrical energy source at a predetermined voltage above the regulation voltage by one of charging and discharging the electrical energy source, via a charging module electrically coupled with the generator and electrical energy source, so as to reduce the generator output voltage variations.

17. The method of claim 16, wherein (i) comprises charging the electrical energy source, via the charging module, when the voltage of the electrical energy source is below the predetermined voltage.

18. The method of claim 16, wherein (i) comprises maintaining the charge of the electrical energy source, via the charging module, when the voltage of the electrical energy source is at the predetermined voltage.

19. The method of claim 16, wherein (i) comprises discharging the electrical energy source, via the charging module, when the voltage of the electrical energy source is above the predetermined voltage.

20. The method of claim 16, further comprising:
(ii) one of storing the electrical energy of the field coil in the electrical energy source and providing the electrical energy in the electrical energy source to the field coil, via the charging module, when the output voltage of the generator differs from the regulation voltage.

21. A method for controlling a generator coupled with a voltage regulator and an electrical energy source, said generator comprising a field coil and one or more stator windings interacting with changing magnetic flux produced by field current through said field coil and providing electrical current to one or more electrical loads, said voltage regulator operative to maintain an output voltage of the generator at a regulation voltage by varying the field current, said electrical energy source operative to one of store and provide electrical energy of the field coil, said method comprising:
(i) measuring a voltage of the electrical energy source, via a first sense line; and
(ii) applying one or more control signals to a charging module electrically coupled with the generator and electrical energy source, via one or more control lines to one of charge and discharge the electrical energy source, to maintain the voltage of the electrical energy source at a predetermined voltage that is above the regulation voltage, so as to reduce the generator output voltage-variations.

22. The method of claim 21, wherein the charging module comprises at least one of a switch, a diode, and a resistor, and wherein the electrical energy source is a capacitor.

23. The method of claim 21, wherein the charging module comprises a first and a second switch and wherein (ii) comprises:
 (a) switching off the first switch; and
 (b) switching on the second switch;
 when the voltage of the electrical energy source is below the predetermined voltage.

24. The method of claim 21, wherein the charging module comprises a first and a second switch and wherein (ii) comprises:
 (a) switching on the first switch; and
 (b) switching off the second switch;
 when the voltage of the electrical energy source is at the predetermined voltage.

25. The method of claim 21, wherein the charging module comprises a first and a second switch and wherein (ii) comprises:
 (a) switching on the first switch; and
 (b) switching on the second switch;
 when the voltage of the electrical energy source is above the predetermined voltage.

26. The method of claim 21, wherein the charging module comprises a first and a second switch and wherein the method further comprises:
 (iii) measuring the output voltage of the generator, via a second sense line;
 wherein (ii) comprises switching on at least One of the first and second switch when the output voltage of the generator differs from the regulation voltage.

27. The method of claim 21, wherein the charging module comprises a switch, a diode, and a resistor and wherein (ii) comprises switching off the switch when the voltage of the electrical energy source is below the predetermined voltage.

28. The method of claim 21, wherein the charging module comprises a switch, a diode, and a resistor and wherein (ii) comprises switching on the switch when the voltage of the electrical energy source is at the predetermined voltage.

29. The method of claim 21, wherein the charging module comprises a switch, a diode, and a resistor and wherein the method further comprises:
 (iii) measuring the output voltage of the generator, via a second sense line;
 wherein (ii) comprises switching off the switch when the output voltage of the generator differs from the regulation voltage.

30. A method for controlling a generator coupled with a voltage regulator and an electrical energy source, said generator comprising a field coil and one or more stator windings interacting with changing magnetic flux produced by field current through said field coil and providing electrical current to one or more electrical loads, said voltage regulator operative to maintain an output voltage of the generator at a regulation voltage by varying the field current, said electrical energy source operative to one of store and provide electrical energy of the field coil, said method comprising:
 measuring a voltage of the electrical energy source, via a first sense line;
 (ii) measuring the output voltage of the generator, via a second sense line;
 (iii) applying one or more control signals to a charging module electrically coupled with the generator and electrical energy source, via one or more control lines to one of charge and discharge the electrical energy source, to:
 (a) maintain the voltage of the electrical energy source at a predetermined voltage that is above the regulation voltage; and
 (b) one of store the electrical energy of the field coil in the electrical energy source and provide the electrical energy in the electrical energy source to the field coil, via the charging module, when the output voltage of the generator differs from the regulation voltage, so as to reduce the generator output voltage variations.

* * * * *